Patented May 29, 1934

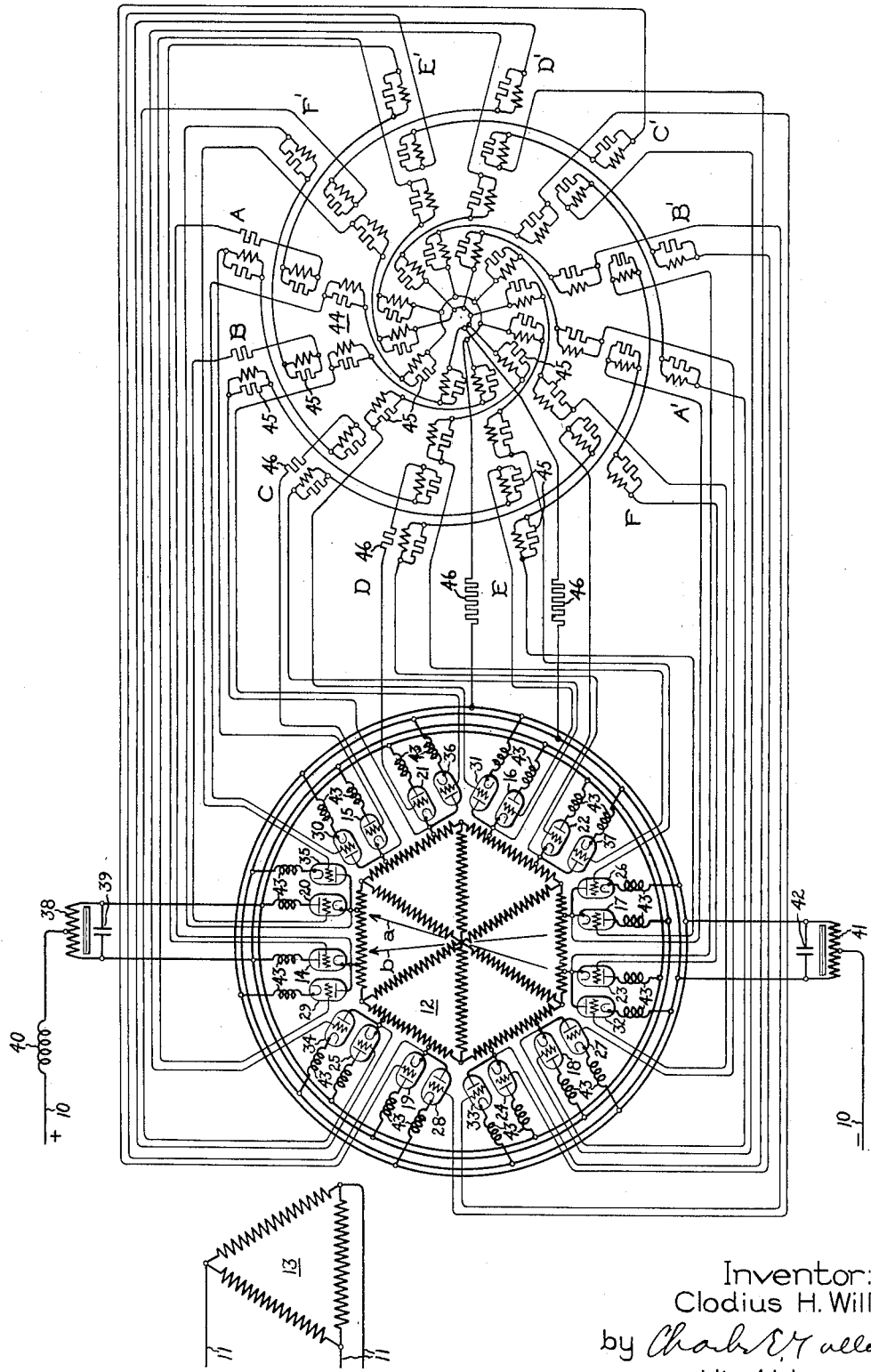

1,961,027

UNITED STATES PATENT OFFICE 1,961,027

ELECTRIC VALVE CONVERTING SYSTEM

Clodius H. Willis, Princeton, N. J., assignor to General Electric Company, a corporation of New York Application December 22, 1931, Serial No. 582,586

5 Claims. (Cl. 175—363)

My invention relates to electric valve converting systems, and more particularly to such systems including electric valves for transmitting energy between direct and alternating current circuits.

Heretofore there have been devised numerous apparatus including electric valves for transmitting energy between direct and alternating current circuits, or between alternating current circuits of different frequencies, phases, or voltages. Many of these arrangements of the prior art have comprised a polyphase inductive network inductively or conductively connected to the alternating current circuit and interconnected with the direct current circuit through a plurality of electric valves which are adapted to be successively rendered alternately conductive and nonconductive. It has been found that when apparatus of this type is connected to supply energy to an alternating current circuit which is not connected to an independent source of electromotive force for determining its frequency and wave form, the wave form of the alternating potential, which is normally a stepped approximation of a sine wave, becomes distorted from such approximation by the departure of the alternating current circuit from unity power factor conditions. The disadvantages of a distorted alternating potential wave are too well known to require discussion. Electric valve converting apparatus of the type to which my invention is particularly applicable are disclosed in my copending applications, Serial Nos. 566,367 and 566,372, filed October 1, 1931, and assigned to the same assignee as the present application, which broadly claim certain features disclosed in the present application. My invention comprises a modification of the apparatus disclosed in my copending application, Serial No. 582,585, filed December 22, 1931, and assigned to the same assignee as the present application, which discloses and broadly claims an electric valve converting apparatus having two axes of conduction displaced in phase, whereas the present invention relates to such an apparatus in which the angular displacement between the axes of conduction is an integral multiple of the angle between adjacent phases of the converter network.

It is an object of my invention, therefore, to provide an improved electric valve converting system for transmitting energy from a direct current supply circuit to an alternating current load circuit, which is not connected to an independent source of electromotive force for determining its wave form, which will overcome the above mentioned disadvantages of the arrangements of the prior art and which will be simple and reliable in operation.

It is a further object of my invention to provide an improved electric valve converting system for transmitting energy from a direct current circuit to an alternating current circuit, which is not connected to an independent source of electromotive force for determining its wave form, by means of which an alternating potential of substantially sinusoidal wave form will be established on the alternating current circuit.

It is a still further object of my invention to provide an improved electric valve converting system for transmitting energy from a direct current circuit to an alternating current circuit in which there is provided for the load current two distinct points of entrance to the polyphase inductive network common to the direct and alternating current circuits, so that the load current may be distributed between these two points of entrance in accordance with the power factor of the system to improve the wave form of the alternating potential established on the alternating current circuit.

In accordance with one embodiment of my invention, direct and alternating current circuits are interconnected through a polyphase inductive network and a plurality of electric valves. The valves are preferably divided into a plurality of groups, each group being connected to terminals of the network separated by a phase angle equal to a multiple of the angle between adjacent phase terminals, and there is preferably provided means for periodically transferring the load current between the groups of valves. To adjacent valves of each group, that is, valves separated by a multiple of the angle between adjacent phases of the network, are simultaneously rendered conductive so that there is provided for the load current two distinct points of entrance to the network, displaced in phase by a multiple of the phase angle of the network. In case the alternating current load circuit departs from unity power factor conditions, the load current will be unequally distributed between these two points of entrance and the equivalent of a circulating wattless current having a maximum value equal to half the load current will flow in the network, thus improving the wave form of the potential established on the alternating current circuit.

For a better understanding of my invention, together with other and further objects thereof, reference is had to the following description taken in connection with the accompanying drawing, and its scope will be pointed out in the appended claims. The single figure of the accompanying drawing illustrates an apparatus embodying my invention for transmitting energy from a direct current circuit to a three-phase alternating current circuit.

Referring now to the drawing, there is illustrated an arrangement for transmitting energy from a direct current circuit 10 to a three phase alternating current circuit 11. This apparatus includes a transformer comprising a six-phase polyphase inductive network 12, provided with twelve symmetrically spaced terminals, as illustrated, to give the equivalent of a twelve phase network, and a three-phase secondary network 13 connected to the alternating current circuit 11. The network 12 is preferably connected as illustrated to form a plurality of geometrically rigid polygons although this feature comprises no part of my present invention, but is disclosed and broadly claimed in my copending application, Serial No. 566,369, filed October 1, 1931, and assigned to the same assignee as the present application. While the two points of entrance of the network 12 may be displaced in phase by an angle equal to any multiple of the angle between adjacent phases, I have shown by way of example an arrangement in which they are displaced by twice the angle between adjacent phases. In this arrangement, alternate phase terminals of the network 12 are connected to one side of the direct current circuit 10 through a group of electric valves 14–19, inc., and one portion of a commutating winding 38 across which is connected a capacitor 39. Similarly, the other phase terminals of the network 12 are connected to this side of the direct current circuit through a second group of valves 20–25, inc., and the right hand portion of the winding 38. If desired, a smoothing reactor 40 may be included in the direct current circuit. Similarly, the several phase terminals of the network 12 are connected to the other side of the direct current circuit through two groups of valves 26–31, inc., and 32–37, inc., and the two halves of a commutating winding 41, across which is connected a capacitor 42. In certain cases, it may be desirable, also, to connect reactance devices 43 in series with, and immediately adjacent to, the anode or cathode of each of the several electric valves in order substantially to eliminate the effect of transients in the apparatus upon the control grids of the several electric valves, although this feature comprises no part of my present invention but is disclosed and claimed in the copending application of O. W. Livingston, Ser. No. 581,396, filed December 16, 1931, and assigned to the same assignee as the present application. Each of the several electric valves 14–37, inc., is provided with an anode, a cathode, and a control grid, and may be of any of the several types well known in the art, although I prefer to use valves of the vapor electric discharge type.

In order to control the conductivity of the several electric valves, there is provided a twelve-phase grid transformer, of which only the secondary network 44 is shown in order to simplify the drawing. This grid transformer may be energized from any suitable source of alternating current of the frequency which it is desired to supply to the alternating current circuit 11. In case valves of the vapor electric discharge type are used, the grid transformer comprising the network 44 should be self-saturating or self-saturating transformers should be interposed between this network and the several valve grids, or some other means should be provided for generating a periodic potential of peaked wave form for exciting the grids of the several electric valves, since each of the electric valves is to be made conductive for an interval somewhat less than 30 electrical degrees. However, this feature of exciting the control grid of a vapor electric discharge valve with an alternating potential of peaked wave form comprises no part of my present invention, but is disclosed and broadly claimed in the copending application of B. D. Bedford, Serial No. 485,335, filed September 29, 1930, and assigned to the same assignee as the present application. Each of the several phases A—A' to F—F' of the network 44 is provided with a plurality of insulated windings for exciting the grids of the several electric valves provided with independent cathode potentials. The grid circuits of each of the valves includes a winding from each of two alternate phases; for example, the grid of electric valve 21 is excited from a winding of phase B and a winding of phase D; the grid of the valve 15 is excited from a winding of phase A and a winding of phase C, etc., so that the grid of each electric valve receives a positive impulse twice each cycle, these impulses being displaced by 60 electrical degrees. Resistors 45 are preferably connected across the several windings of the network 44 in order to minimize the reflection of impulses generated in one grid circuit upon the other grid circuit, due to their inductive coupling through the several windings of a single phase. Current limiting resistors 46 may also be connected in the several grid circuits, an arrangement which is well known in the art.

In explaining the operation of the above described apparatus, it will be assumed that the potential of the network 44 is such that potential impulses of peaked wave form are being supplied by the several windings of the phase A—A', the polarities being such that electric valves 14, 15, 26 and 27 are made conductive, while electric valves 17, 18, 29 and 30 are given negative potential impulses which are ineffective. In case the current entering the network 12 through electric valves 14 and 15 and leaving through electric valves 26 and 27 is distributed equally between these valves conducting in parallel, the equivalent axis of conduction of the network may be represented by the vector $a$. Under unity power factor conditions with the counter-electromotive force of the alternating current circuit in phase with the current, this vector also represents the axis of maximum instantaneous electromotive force of the network 12. However, under certain non-unity power factor conditions on the circuit 11, the axis of maximum electromotive force of the net work 12 may be represented by the vector $b$. Under these conditions, it is seen that the counter-electromotive force of the network 12 interconnecting the electric valves 14 and 26 is greater than that of the network between the points to which electric valves 15 and 27 are connected, with the result that a larger proportion of the current will flow through the valves 15 and 27 than the valves 14 and 26. This unequal distribution of the load current through the network is the equivalent to a circulating quadrature current sufficient in magnitude to bring the axis of electromotive force of the network 12 into line with the equivalent axis of conduction. The result of this is to produce a uniform potential distribution throughout the network 12 and establish a substantially sinusoidal alternating potential on the circuit 11.

Substantially 30 electrical degrees after the valves 14 and 15 are made conductive, the valves 20 and 21 and 32 and 33 are excited. During the interval in which the valves 14 and 15 are conductive current flows from the positive side of the direct current circuit through the left hand portion of the commutating winding 38, valves 14 and 15, the network 12, the valves 26 and 27, and the right hand portion of the commutating winding 41, to the other side of the direct current circuit. This current flowing in one half of each of the windings 38 and 41 must be balanced by an equal and opposite current through the other half of each winding, neglecting the magnetizing current of the reactors, and this balancing current must flow through the capacitors 39 and 42 respectively. During this interval these capacitors become changed to a potential dependent upon the magnitude of the load current and of such polarity that, when the electric valves 20 and 21, and 32 and 33 are rendered conductive, they are effective to commutate the current from the group of valves including the valves 14 and 15 and 26 and 27 to the group of valves including the valves 20 and 21 and 32 and 33. Again the current is distributed between the two parallel connected valves in such a way as to provide a uniform potential distribution over the network 12. Substantially 30 electrical degrees later, electric valve 15 is again made conductive and with it electric valve 16 and the corresponding valves connected to the other side of the direct current circuit, and this process is repeated throughout a complete cycle, the current being alternately transferred between the two groups of valves and being so distributed between the parallel connected valves of each group as to produce a sinusoidal potential on the alternating current circuit 11. It is seen that each electric valve is conductive for an interval of 30 electrical degrees, is non-conductive for an interval of 30 electrical degrees, then is rendered conductive a second time for an interval of 30 electrical degrees in each cycle of operation. As explained in more detail in the above mentioned Livingston application, the reactances 43 connected in series with the several electric valves tend to suppress potential transients set up in the circuit due to the rapid transfer of current between the two groups of valves, which transients tend to induce electrostatic potentials on the grids of the electric valves tending to deprive them of control of the conductivity of their respective valves.

Although I have illustrated an arrangement for transmitting energy to a three-phase alternating current circuit by means of a twelve-phase full wave electric valve converting apparatus, it will be obvious to those skilled in the art that any other number of phases may be utilized and that a half wave arrangement may be substituted for a full wave arrangement by eliminating the valves connected to one side of the direct current circuit and connecting that side to the electrical neutral of the network 12, as is well understood by those skilled in the art.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric valve converting system comprising a direct current supply circuit, an alternating current load circuit, a polyphase inductive network and a plurality of electric valves interconnecting said circuits, means for simultaneously rendering conductive two valves associated with terminals of said network displaced in phase by an angle equal to a multiple of the angle between adjacent phases to provide a path for circulating wattless current.

2. An electric valve converting system comprising a direct current supply circuit, an alternating current load circuit, a polyphase inductive network and a plurality of electric valves interconnecting said circuits, and means for controlling the conductivity of said valves to provide for the load current two points of entrance to said network displaced in phase by a multiple of the angle between adjacent phases of said network.

3. An electric valve converting system comprising a direct current supply circuit, an alternating current load circuit, a polyphase inductive network, a plurality of groups of electric valves, each interconnecting said direct current circuit with terminals of said network displaced in phase by an angle equal to a multiple of the angle between adjacent phases, means for successively transferring the load current between said groups, and means for maintaining conductive two adjacent valves of a group at any given instant.

4. An electric valve converting system comprising a direct current supply circuit, an alternating current load circuit, a polyphase inductive network, two groups of electric valves, each interconnecting said direct current circuit with alternate phase terminals of said network, a commutating winding included in the connections to said direct current circuit and provided with an electrical midpoint connected to said direct current circuit and with end terminals each connected to one of said groups, and means for maintaining conductive two valves of a single group at any given instant.

5. An electric valve converting system comprising a direct current supply circuit, an alternating current load circuit, a polyphase inductive network, two groups of electric valves provided with control grids, each group interconnecting said direct current circuit with alternate phase terminals of said network, means for successively transferring the load current between said groups, and means for exciting said control grids with positive potential impulses displaced in phase by twice the angle between adjacent phases of said network, whereby two adjacent valves of a group are simultaneously rendered conductive.

CLODIUS H. WILLIS.